United States Patent [19]

Ahmed Jallouli et al.

[11] Patent Number: 5,830,969

[45] Date of Patent: *Nov. 3, 1998

[54] SILYL ESTER INITIATORS FOR RING OPENING POLYMERIZATION OF CYCLOSILOXANES

[75] Inventors: Aref Ben Ahmed Jallouli; John Carlton Saam, both of Midland, Mich.

[73] Assignee: Dow Corning Corporation, Midland, Mich.

[*] Notice: The term of this patent shall not extend beyond the expiration date of Pat. No. 5,696,219.

[21] Appl. No.: 864,418

[22] Filed: May 28, 1997

[51] Int. Cl.$^6$ .................................................. C08G 77/08
[52] U.S. Cl. ................... 528/21; 528/23; 528/42
[58] Field of Search .................... 528/21, 23, 42

[56] References Cited

U.S. PATENT DOCUMENTS

| | | | |
|---|---|---|---|
| 3,122,521 | 2/1964 | Pierce | 260/46.5 |
| 3,373,138 | 3/1968 | Brown | 260/46.5 |
| 3,974,120 | 8/1976 | Razzano et al. | 528/23 |
| 5,401,822 | 3/1995 | Collins | 528/18 |
| 5,696,219 | 12/1997 | Jallouli et al. | 528/21 |

OTHER PUBLICATIONS

Journal of Polymer Science: Part A: Polymer Chemistry, vol. 33, 285–298, (1995).
Macromol. Chem. Phys., 196, 2715–2735, (1995).

Primary Examiner—Jeffrey T. Smith
Assistant Examiner—D. Aylward
Attorney, Agent, or Firm—James L. DeCesare

[57] ABSTRACT

Method of making polysiloxanes by ring opening polymerization of dimethylcyclosiloxanes such as hexamethylcyclotrisiloxane ($D_3$), and cyclosiloxanes such as 1,3,5-trimethyl-1,3,5-tris(3',3',3'-trifluoropropyl) cyclotrisiloxane ($F_3$) or 1,3,5,7-tetramethyl-1,3,5,7-tetrakis(3',3',3'-trifluoropropyl) cyclotetrasiloxane ($F_4$) in an acid-free system using electrophillic initiators. The reaction mixture is formed under anhydrous conditions and contains (i) the cyclosiloxanes, (ii) a Lewis base such as 2,6-di-tert-butylpyridine which serves as a co-catalyst and an acid scavenger, and optionally (iii) a salt of a strong acid such as tetrabutylammonium trifluoromethane sulfonate. The anhydrous mixture is contacted with a silyl ester of a strong acid such as triflic acid. The anhydrous reaction mixture is agitated at room temperature until a polysiloxane is formed. Polymerization can be initiated practically immediately after introduction of the cyclosiloxanes, by first adding the Lewis base to the silyl ester, and allowing the Lewis base and the silyl ester to interact.

18 Claims, No Drawings

SILYL ESTER INITIATORS FOR RING OPENING POLYMERIZATION OF CYCLOSILOXANES

CROSS-REFERENCE TO RELATED APPLICATIONS

This application is related to our prior U.S. application Ser. No. 08/784,589, filed Jan. 21, 1997, U.S. Pat. No. 5,696,219, entitled "Silyl Ester Initiators for Cyclosiloxane Ring Opening Polymerization", assigned to the same assignee as the present application.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention is directed to methods of making polymers and copolymers by ring opening polymerization, and more particularly to methods of making polysiloxanes by ring opening polymerization of cyclosiloxanes.

Krzysztof Matyjaszewski et al. in the Journal of Polymer Science: Part A: Polymer Chemistry, Volume 33, Pages 285–298, (1995) have reported that trimethylsilyl trifluoromethane sulfonate, i.e., trimethylsilyl triflate, in the presence of promoters such as acetone, initiates ring opening polymerization of heterocyclic compounds such as tetrahydrofuran or 2-methyl-2-oxazoline, but cyclosiloxanes were not considered. In the Matyjaszewski et al. polymerizations, carbon-oxygen or carbon-nitrogen bonds break and reform. These types of bonds are significantly different from silicon-oxygen bonds in their behavior.

Furthermore, Pierre Sigwalt et al. in Macromol. Chem. Phys., 196, No. 9, Pages 2715–2735, (September 1995), show that trimethylsilyl triflate in the presence of a proton trap, is not an initiator for the ring opening polymerization of 1,3,5-trimethylcyclotrisiloxane, i.e., hexamethylcyclotrisiloxane ($D_3$) shown below:

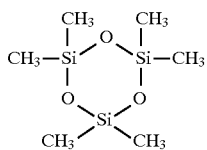

Pierre Sigwalt et al. also show that polymerization proceeds only when free trifluoromethane sulfonic acid, i.e., $CF_3SO_3H$ (triflic acid), the true catalyst, is present with trimethylsilyl triflate. The Pierre Sigwalt et al. citation does not relate to the polymerization of fluoroalkyl functional cyclosiloxanes, nor does it mention optionally using soluble salts, promoters, or co-catalysts in combination with trimethylsilyl triflate in an acid-free system.

BRIEF SUMMARY OF THE INVENTION

Our invention relates to a method of making polysiloxanes from cyclosiloxanes by ring opening polymerization in an acid-free system. The method comprises the steps of:

(A) forming a mixture, preferably under anhydrous conditions, containing (i) a cyclosiloxane of the formula $(RR'SiO)_x$ where R is an alkyl radical with 1–8 carbon atoms; R' is an alkyl radical with 1–8 carbon atoms, or a fluoroalkyl radical of 3–8 carbon atoms; and x is 3–6; (ii) a Lewis base; and optionally (iii) a salt of a strong acid;

(B) contacting the mixture with a silyl ester of the strong acid; and (C) agitating the mixture and the silyl ester at room temperature to form the polysiloxane.

Preferably, the Lewis base is first added to the silyl ester and allowed to interact, before introduction of the cyclosiloxane. If the Lewis base is first added to the silyl ester, and allowed to interact, polymerization begins substantially immediately after introduction of the cyclosiloxane.

These and other features and objects of our invention will become apparent from a consideration of the detailed description.

BRIEF DESCRIPTION OF THE SEVERAL VIEWS OF THE DRAWING

Not applicable.

DETAILED DESCRIPTION OF THE INVENTION

We have found that silyl esters of strong acids, such as trimethylsilyl trifluoromethane sulfonate, shown below:

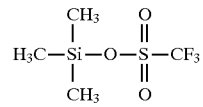

(which can optionally be combined with certain soluble salts such as tetrabutylammonium trifluoromethane sulfonate $(CF_3SO_3)N[(CH_2)_3CH_3]_4$, i.e., tetrabutylammonium triflate), are effective initiators for the ring opening polymerization of fluoroalkyl cyclosiloxanes, as well as other dialkylcyclosiloxanes.

We have also found that polymerization is non-terminating when conducted in a dry environment, and that it can be re-initiated after consumption of the original monomer by addition of more of the monomer. This enables formation of block copolymers, if desired, in instances where a second monomer is employed which differs from the original or first monomer.

The polymerizations are conducted preferably under anhydrous conditions, in the presence of a Lewis base such as 2,6-di-tert-butylpyridine (shown below), which acts as a proton trap, so that there is no adventitious initiation by free triflic acid accidentally introduced to the system.

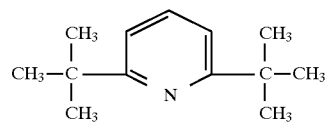

It can also function as a co-catalyst, when it is allowed to interact, prior to polymerization, with the silyl ester.

The polymerization can be conducted at room temperature, i.e. about 20°–25° C./68°–77° F., in solution or bulk. We have demonstrated in examples which follow, that with our initiator system, good yields of polymer product can be obtained from 1,3,5-trimethyl-1,3,5-tris(3',3',3'-trifluoropropyl) cyclotrisiloxane shown below:

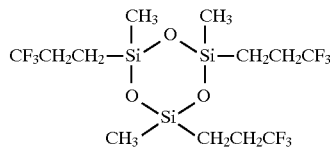

Only small amounts of by-produced cyclosiloxanes are present in the reaction product. A comparative example shows that 2,6-di-t-butylpyridine trifluoromethane sulfonate, i.e., 2,6-di-t-butylpyridine triflate, the salt formed if triflic acid were accidentally introduced during the process, is an ineffective initiator for siloxane ring opening polymerization.

The first step in performing our method of making polysiloxanes from fluoroalkyl functional cyclosiloxanes by ring opening polymerization, is to form a mixture, preferably under anhydrous conditions, containing a cyclosiloxane of the formula $(RR'SiO)_x$, where R is an alkyl radical with 1–8 carbon atoms; x is 3–6; and R' is a fluoroalkyl radical of 3–8 carbon atoms, or a an alkyl radical with 1–8 carbon atoms. Suitable R groups are methyl, ethyl, propyl, isopropyl, butyl, isobutyl, pentyl, hexyl, heptyl, and octyl. Suitable R' groups are $CF_3CH_2CH_2-$, $C_2F_5CH_2CH_2-$, $C_3F_7CH_2CH_2-$, and $C_7F_{15}CH_2CH_2-$. Preferably, R is methyl and R' is $CF_3CH_2CH_2-$. Preferred cyclosiloxanes according to our invention are hexamethylcyclotrisiloxane ($D_3$), octamethylcyclotetrasiloxane ($D_4$), 1,3,5-trimethyl-1,3,5-tris(3',3',3'-trifluoropropyl) cyclotrisiloxane ($F_3$), and 1,3,5,7-tetramethyl-1,3,5,7-tetrakis(3',3',3'-trifluoropropyl) cyclotetrasiloxane ($F_4$)

To the cyclosiloxane is added a Lewis base. Some examples of appropriate Lewis bases that can be employed are tertiary amines such as triethylamine, tri-n-butylamine, and phenyldimethylamine; pyridine; and pyridine derivatives such as 2,6-dimethylpyridine, 2-methylpyridine, 2,4,6-trimethylpyridine, 2,4-dimethylpyridine, and 2,6-di-tert-butylpyridine. The preferred Lewis base according to our invention is 2,6-di-tert-butylpyridine.

If the Lewis base is first added to the silyl ester, and allowed to interact for about 18 to 20 hours, long induction periods can be avoided, such that polymerization will begin immediately after the cyclosiloxanes have been introduced.

An optional ingredient that can be added to the cyclosiloxane and the Lewis base, is a salt of a strong acid. By "strong acid" is meant any acid defined as being a super acid or any acid which is ten times stronger than sulfuric acid, such as perfluoroalkane sulfonic acids. The most preferred strong acid is trifluoromethane sulfonic acid $CF_3SO_3H$, although other perfluoroalkane sulfonic acids such as $C_2F_5SO_3H$, $C_4F_9SO_3H$, $C_5F_{11}SO_3H$, $C_6F_{13}SO3H$, and $C_8F_{17}SO_3H$ can be employed.

Tetraalkylammonium salts of these perfluoroalkane sulfonic acids are most preferred such as tetraethylammonium trifluoromethane sulfonate or tetrabutylammonium trifluoromethane sulfonate. The most preferred optional promoter or co-catalyst for our ring opening polymerization method is tetrabutylammonium trifluoromethane sulfonate.

The initiator for the ring opening polymerization method according to our invention is a silyl ester of the strong acid referred to above. Suitable silyl esters generally conform to the formula:

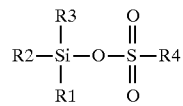

where R1, R2, and R3 are alkyl or fluoroalkyl radicals containing 1–6 carbon atoms, such as methyl, ethyl, propyl, isopropyl, 3,3,3-trifluoropropyl, butyl, isobutyl, pentyl, and hexyl, most preferably methyl or 3,3,3-trifluoropropyl; and R4 is a perfluoroalkyl group, such as $-CF_3$, $-C_2F_5$, $-C_4F_9$, $-C_5F_{11}$, $-C_6F_{13}$, or $-C_8F_{17}$, most preferably the $-CF_3$ group.

It is preferred to conduct the process of our invention at room temperature, i.e., 20°–25° C., but the process can be carried out at a temperature from the freezing point of the reaction mixture to the volatilization point of the silyl ester, which is preferably from room temperature to about 120° C. It is also preferred to conduct the process under anhydrous conditions The process can be carried out in the presence of a solvent, however, the solvent must be one with no active protons which might interfere with growing polymerization centers. One suitable solvent, for example, is methylene chloride. Equivalent amounts of reactants should be employed in the process, although it may be necessary to use an excess of one or more of the reactants. The maximum amount is determined, for example, by economical considerations, as there is no benefit in employing an excess of a reactant that is not consumed. The minimum amount will depend on the type and purity of the reactants.

The following examples are set forth for the purpose of illustrating our invention in more detail. The cyclosiloxane used in these examples was the compound 1,3,5-trimethyl-1,3,5-tris(3',3',3'-trifluoropropyl) cyclotrisiloxane ($F_3$), and it contained 23% of the cis isomer and 77% of the trans isomer according to $^{13}C$ Nuclear Magnetic Resonance (NMR). The compound 2,6-di-tert-butylpyridine 8.24×10⁻2M in methylene chloride (as a diluent) was dried over calcium hydride and filtered prior to its use. Methylene chloride was also dried over calcium hydride and filtered prior to its use. Opened ampoules of trimethylsilyl triflate were kept in a moisture-free environment.

Prior to use, all glassware including syringes and pipettes that would contact the reagents and catalysts, were baked at 100° C. under vacuum, cooled, and stored while being protected from moisture. Polymer yields were estimated from the area percent of polymer fraction noted in Gel Permeation Chromatograms (GPC), and the area percent was corrected for difference in refractive indices between the polymer obtained and any cyclosiloxanes present in the product. The results of this procedure agree substantially with results obtained when the polymer is isolated by precipitation in n-hexane, in order to remove any low molecular weight cyclosiloxane species which may be present.

EXAMPLE I

The Polymerization of $F_3$

A 50 ml three necked flask equipped with a magnetic stirrer, a rubber septum on one port, an inlet for an inert gas on another port, and a rubber balloon on the third port, was flamed under vacuum, and then filled with dry argon, so that the balloon would just fill and slightly expand. The freshly dried and filtered $F_3$, 4.0 ml (10.6 mmol), was injected through the septum, followed by 1.4 ml (0.115 mmol) of the freshly dried and filtered 2,6-di-tert-butylpyridine solution.

The mixture at this point contained 25.8% of methylene chloride which was introduced with the 2,6-di-tert-butylpyridine solution. Then 20 µl (0.103 mmol) of trimethylsilyl triflate was injected with stirring at room temperature (23°–25° C.). Stirring was continued at room temperature for 24 hours after which there had been a substantial increase in viscosity. The polymerization was terminated by stirring for one hour with an excess of sodium bicarbonate over the trimethylsilyl triflate. The mixture was washed several times with water and dried in a vacuum to remove residual solvent and water, to provide 4.97 g of a non-volatile product (99.8%). Analysis by GPC indicated that the product was composed of 81.3% polymer having a number average molecular weight ($M_n$) of 28,100, and a polydispersity ($M_w/M_n$) of 2.2. The remaining 18.7% of the product was a mixture of oligomeric siloxanes composed mainly of $F_4$–$F_6$.

EXAMPLE II

Comparative

When the same procedure in Example I was followed, but with trimethylsilyl triflate replaced with 0.4 ml of triflic acid solution in dry methylene chloride (0.068 mmol), added to 4.0 ml (10.6 mmol) of freshly dried and filtered $F_3$, and 1.0 ml (0.082 mmol) of freshly dried and filtered 2,6-di-tert-butylpyridine solution, only 9.1 weight percent of polymer ($M_n$ 9,800, $M_w/M_n$ 3.7) formed after 164 hours of reaction. The balance of this product was a mixture of cyclosiloxanes composed of 78% $F_6$ and 22% $F_4$+$F_5$. This comparative example shows that 2,6-di-tert-butylpyridine is an effective proton trap, and that the results obtained according to the method of our invention in Example I could not have been not caused by an accidental catalysis with triflic acid.

The following are some additional examples in order to illustrate further features of our invention. In these examples, a mixture of approximately 25% cis and 75% trans-1,3,5-trimethyl-1,3,5-tris(3,3,3-trifluoropropyl)cyclotrisiloxane ($F_3$) was used, and the mixture was dried over calcium hydride and filtered prior to use. 1,3,5-hexamethylcyclotrisiloxane ($D_3$) was used as a 2.833 molar (M) solution in methylene chloride, which was dried, purified over calcium hydride, filtered prior to use. 2,6-di-tert-butylpyridine (DTBP) in methylene chloride ($8.239 \times 10^{-2}$M) was similarly purified and dried. Trimethylsilyl trifluoromethylsulfonate (hereafter referred to as trimethylsilyl triflate or Me$_3$SiOTf) was used as received in sealed ampoules.

The reactor was a 50 ml three-necked flask and magnetic stirrer, equipped with a stopcock, rubber septum, and a balloon to contain excess gas. The reactor was baked several times with a flame while in a vacuum, filled with dry argon so the balloon would expand, and transferred to a glove bag. All other equipment and glassware that contacted the reagents was previously dried in a vacuum at 100° C. overnight, and transferred to a glove bag along with the dried reagents. The glove bag was evacuated and re-filled with dry argon, and all filtrations and reagent transfers were conducted in this environment. Polymerizations were terminated by stirring about one hour with excess sodium bicarbonate, and the polymer solutions were washed several times with water, then dried in vacuo at room temperature. Polymer yields were estimated from their relative area fractions (corrected for refractive index differences with the accompanying cyclosiloxanes) in their gel phase chromatograms.

EXAMPLE III

Elimination of Induction Periods and Importance of 2,6-di-tert-butylpyridine

This example shows that DTBP acts as more than just an acid absorber. The example shows that DTBP eliminates induction periods, if it is allowed to interact with Me$_3$SiOTf prior to polymerization. Thus, after filtering, 1.4 ml of a DTBP solution (0.115 mmol) was injected through the septum into the reactor, followed by 20 µl of Me$_3$SiOTf (0.106 mmol). The mixture was stirred at room temperature for 20 hours. Then 4.0 ml (10.6 mmol) of dried and filtered $F_3$ were injected, whereupon the viscosity of the stirred mixture increased within an hour. The mixture was stirred at room temperature for 6 hours while being monitored by gel phase chromatograph (GPC). Polymerization was terminated, and the polymer was isolated. The results of this example are shown below in Table 1. In the Table, $M_n$ and $M_w$ represent number average molecular weight, and weight average molecular weight, respectively.

TABLE 1

Room Temperature Polymerization of $F_3$ Initiated with Me$_3$SiOTf and Pre-Aged with DTBP

| Reaction Time Hours | Polymer Yield Percent | $M_n \times 10^{-3}$ ($M_w/M_n$) | $M_n \times 10^{-3}$ (Predicted)[a] |
|---|---|---|---|
| 1.0 | 41.5 | 21.7 (2.3) | 20.0 |
| 4.0 | 71.6 | 30.3 (2.1) | 34.5 |
| 6.0 | 72.6 | 31.4 (2.0) | 34.9 |

[a]Based on ratio of $F_3$ converted to mols of Me$_3$SiOTf used.

Table 1 shows that polymerization began instantly, and that it was essentially complete in 4 hours. A similar experiment was conducted without pre-aging Me$_3$SiOTf with DTBP, and the results were long induction periods at room temperature. Replacing DTBP with $F_3$ during the pre-aging period resulted in only a 6% yield of polymer after one hour of polymerization time.

EXAMPLE IV

Illustration of the Non-Terminating Nature of the Polymerization

This example shows that under dry conditions, polymerization has no termination step. Thus, as in Example III, 1.4 ml of filtered DTBP solution (0.115 mmol) was mixed with 20 µl of Me$_3$SiOTf (0.1035 mmol) for 22.5 hours, and 2.1 ml of dried and filtered $F_3$ (5.58 mmol) was injected. After stirring 6.8 hours at room temperature, a second injection of 2.0 ml of dried and filtered $F_3$ (5.31 mmol) was injected. The reaction was monitored by GPC, and then it was terminated after stirring an additional 16 hours at room temperature. The results of this example are shown below in Table 2.

TABLE 2

Restarting Polymerization after Consumption Initial Amounts of $F_3$

| Reaction Time Hours | Polymer Yield Percent | $M_n \times 10^{-3}$ ($M_w/M_n$) | $M_n \times 10^{-3}$ (Predicted)[b] |
|---|---|---|---|
| 3.1 | 33.0 | 17.9 (2.0) | 16.3 |
| 6.8[c] | 33.9 | 18.6 (1.9) | 16.7 |
| 9.1 | 51.7 | 27.9 (2.1) | 25.5 |
| 22.8 | 60.8 | 27.9 (2.2) | 30.0 |

[a]Based on total amounts of $F_3$.
[b]Based on ratio of $F_3$ converted to mole of Me$_3$SiOTf used.
[c]Fresh injection of $F_3$ at this point.

Table 2 shows that polymerizing centers remain active and undiminished, even after much of the monomer is consumed. This is confirmed and supported by close agreement of predicted and observed molecular weights in Tables 1 and 2.

EXAMPLE V

Forming a Block Copolymer between $F_3$ and $D_3$

This example utilizes non-terminating reactive centers, noted in Example IV, in order to form a block copolymer. Thus, as in Example IV, 1.4 ml of filtered DTBP solution (0.115 mmol) was mixed with 20 μl of Me$_3$SiOTf (0.1035 mmol) for 18.4 hours, and 2.0 ml of dried filtered $F_3$ (5.31 mmol) was injected with stirring at room temperature. After 5 hours, the viscosity increased, and 1.9 ml of filtered methylene chloride solution of a second monomer $D_3$ (5.38 mmol) was injected. An instant increase in viscosity was noted. The mixture was stirred for an additional 3.6 hours at room temperature, the polymerization was terminated, and a copolymer was isolated. The results of this example are shown below in Table 3.

TABLE 3

Sequential Copolymerization of $F_3$ and $D_3$

| Reaction Time Hours | Polymer Yield Percent | $M_n \times 10^{-3}$ ($M_w/M_n$) | $M_n \times 10^{-3}$ (Predicted)[a] |
|---|---|---|---|
| 4.0 | 47.9 | 20.7 (1.7) | 17.1 |
| 5.0[c] | 71.2 | 27.7 (1.9) | 28.7 |
| 8.6 | 71.5 | 28.8 (2.3) | 28.7 |

[a]Based on toal amounts of $F_3$ and $D_3$.
[b]Based on ratio of $F_3$ and $D_3$ converted to mols of Me$_3$SiOTf used.
[c]$D_3$ injected at this point.

Table 3 evidences agreement between predicted and observed molecular weights. This establishes that the $D_3$ and $F_3$ units were tied together. The block-like nature of the resulting copolymer was confirmed by multiple glass transition temperatures ($T_g$) observed by differential scanning calorimetry (DSC) at −136° C. (D blocks) and −86° C. (F blocks).

Other variations may be made in compounds, compositions, and methods described herein without departing from the essential features of our invention. The forms of invention are exemplary only and not intended as limitations on their scope as defined in the appended claims.

We claim:

1. A method of making polysiloxanes from cyclosiloxanes by ring opening polymerization in an acid-free system comprising the steps of:
    (A) mixing under anhydrous conditions (i) a cyclosiloxane of the formula (RR'SiO)$_x$ where R is an alkyl radical with 1–8 carbon atoms; R' is a fluoroalkyl radical of 3–8 carbon atoms, or an alkyl radical with 1–8 carbon atoms; and x is 3–6; (ii) a Lewis base; optionally (iii) a salt of a strong acid; and (iv) a silyl ester of the strong acid; and
    (B) agitating the mixture to form a polysiloxane;
    with the proviso that the Lewis base is first added to the silyl ester, and allowed to interact, before introduction of the cyclosiloxane.

2. A method according to claim 1 in which the cyclosiloxane is 1,3,5-trimethyl-1,3,5-tris(3',3',3'-trifluoropropyl) cyclotrisiloxane or 1,3,5,7-tetramethyl-1,3,5,7-tetrakis(3',3', 3'-trifluoropropyl) cyclotetrasiloxane.

3. A method according to claim 1 in which the Lewis base is a compound selected from the group consisting of triethylamine, tri-n-butylamine, phenyldimethylamine, pyridine, 2,6-dimethylpyridine, 2-methylpyridine, 2,4,6-trimethylpyridine, 2,4-dimethylpyridine, and 2,6-di-tert-butylpyridine.

4. A method according to claim 3 in which the Lewis base is 2,6-di-tert-butylpyridine.

5. A method according to claim 1 in which the strong acid is trifluoromethane sulfonic acid.

6. A method according to claim 5 in which the salt of the strong acid is tetrabutylammonium trifluoromethane sulfonate.

7. A method according to claim 1 in which the silyl ester of the strong acid is a compound having the formula:

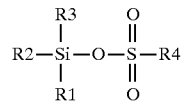

where R1, R2, and R3 are alkyl or fluoroalkyl radicals containing 1–6 carbon atoms, and R4 is a perfluoroalkyl group.

8. A method according to claim 7 in which the silyl ester of the strong acid is trimethylsilyl trifluoromethane sulfonate.

9. A method according to claim 1 in which step (B) is carried out at room temperature.

10. A method according to claim 1 in which component (i) comprises at least two cyclosiloxanes differing one from the other, whereby a block copolymer is formed.

11. A method according to claim 10 in which the two cyclosiloxanes are added sequentially.

12. A method according to claim 11 in which the cyclosiloxanes comprise hexamethylcyclotrisiloxane and 1,3,5-trimethyl-1,3,5-tris(3',3',3'-trifluoropropyl) cyclotrisiloxane.

13. A method of making polysiloxanes by ring opening polymerization of a fluoroalkyl functional cyclosiloxane in an acid-free system comprising the steps of:
    (A) mixing under anhydrous conditions (i) 1,3,5-trimethyl-1,3,5-tris(3',3',3'-trifluoropropyl) cyclotrisiloxane; (ii) 2,6-di-tert-butylpyridine; optionally (iii) tetrabutylammonium trifluoromethane sulfonate; and (iv) a silyl ester of a strong acid having the formula:

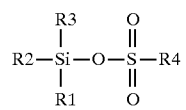

where R1, R2, and R3 are alkyl or fluoroalkyl radicals containing 1–6 carbon atoms, and R4 is a perfluoroalkyl group; and
    (B) agitating the mixture to form a polysiloxane;
    with the proviso that 2,6-di-tert-butylpyridine is first added to the silyl ester, and allowed to interact, before introduction of the fluoroalkyl functional cyclosiloxane.

14. A method according to claim 13 in which the silyl ester of the strong acid is trimethylsilyl trifluoromethane sulfonate.

15. A method according to claim 14 in which step (B) is carried out at room temperature.

16. A method according to claim 13 in which component (i) comprises a second different cyclosiloxane, whereby a block copolymer is formed.

17. A method according to claim 16 in which the cyclosiloxanes are added sequentially.

18. A method according to claim 17 in which the second cyclosiloxane comprises hexamethylcyclotrisiloxane.

* * * * *